May 8, 1962 G. E. HUGHES 3,033,322
BRAKING AND RETARDING APPARATUS
Filed Sept. 30, 1957 4 Sheets-Sheet 1
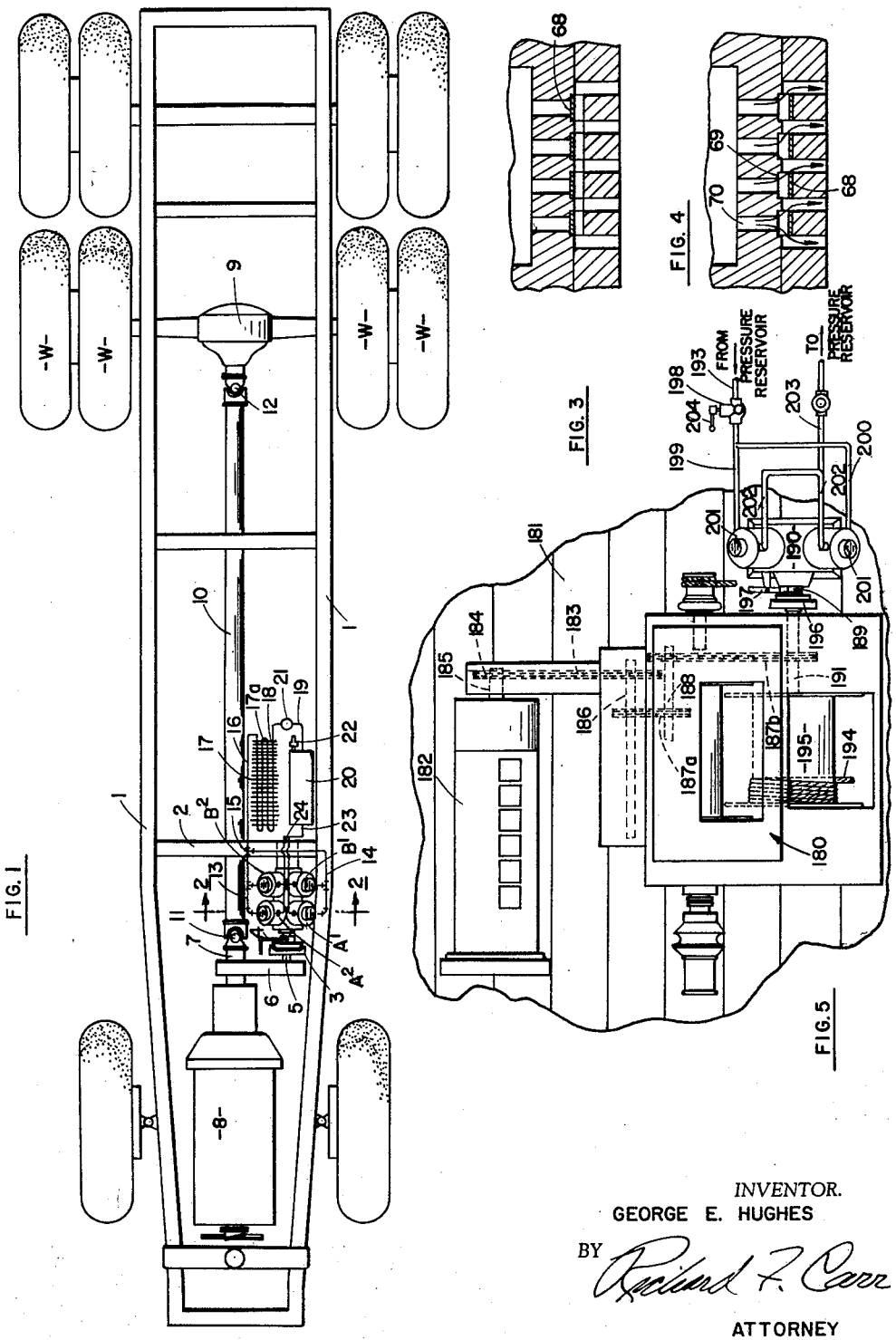
INVENTOR.
GEORGE E. HUGHES
BY
ATTORNEY

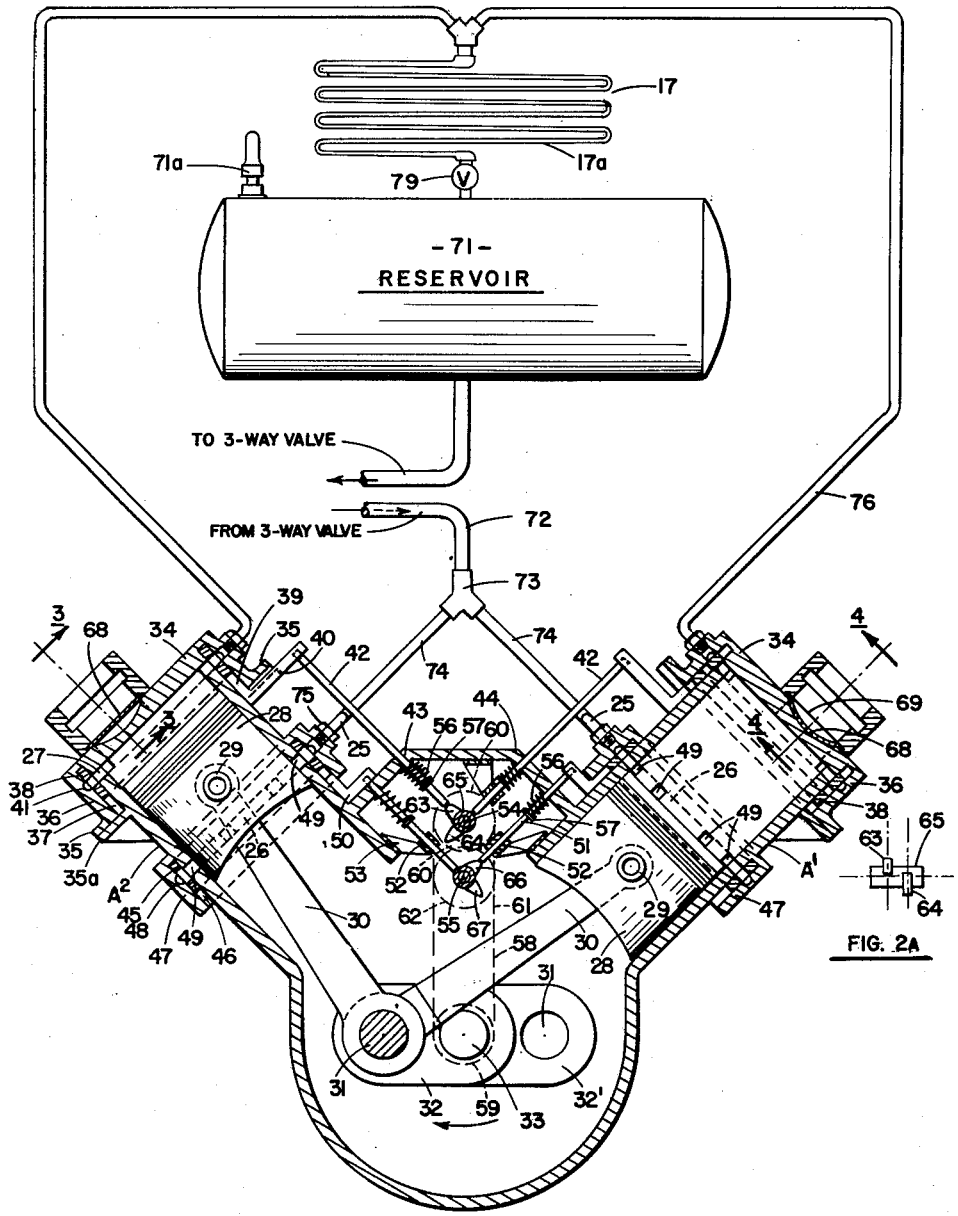

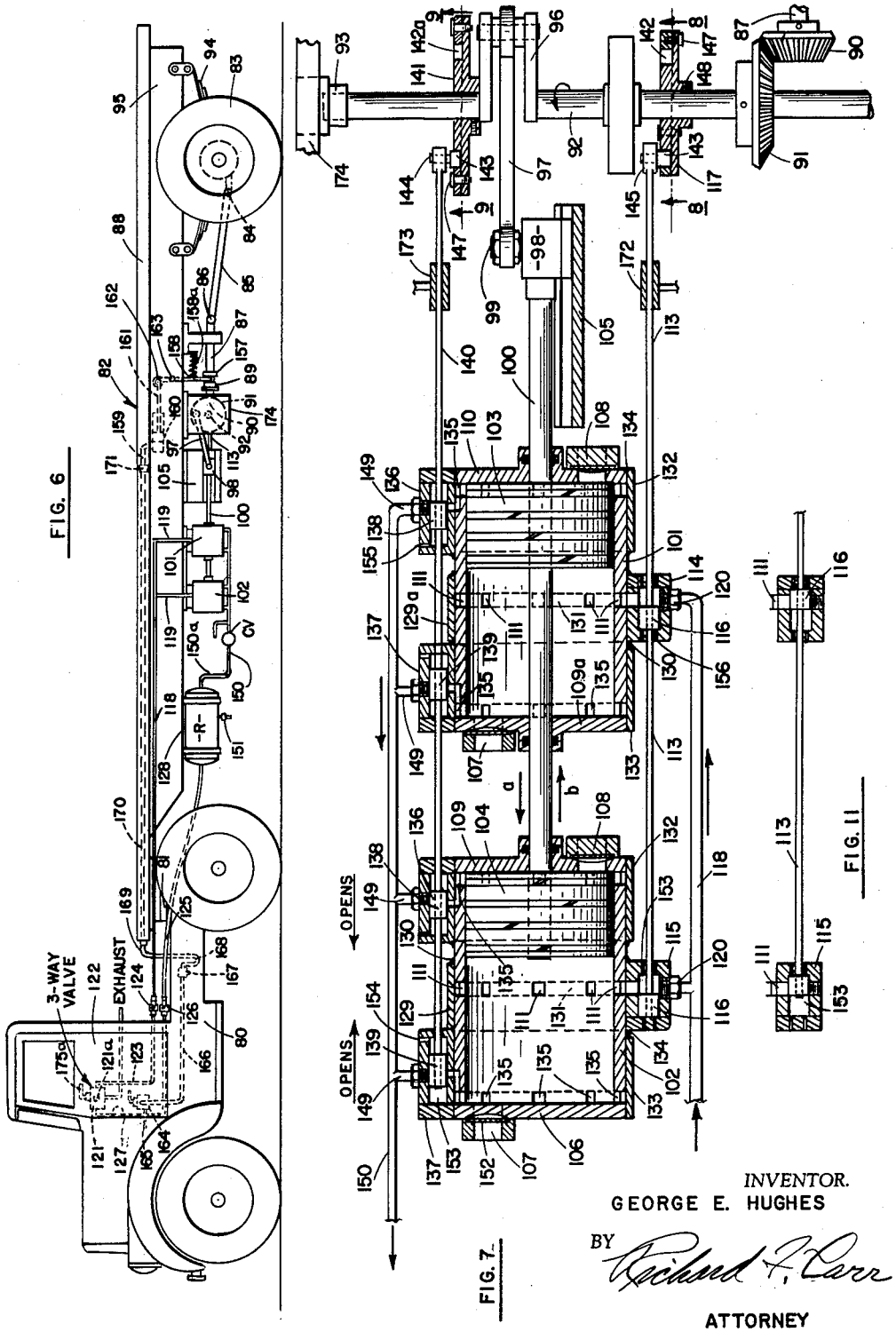

May 8, 1962  G. E. HUGHES  3,033,322
BRAKING AND RETARDING APPARATUS
Filed Sept. 30, 1957  4 Sheets-Sheet 4
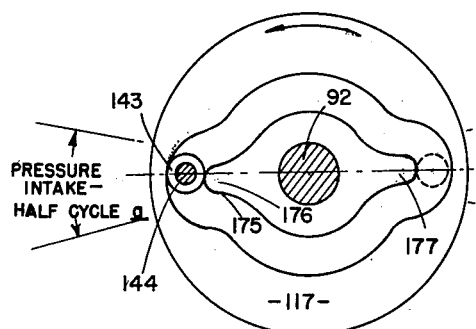
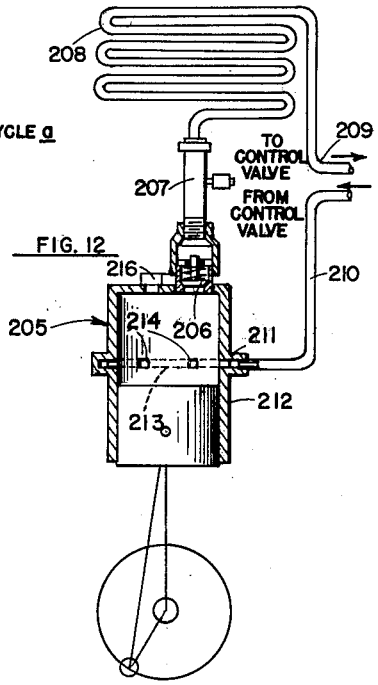
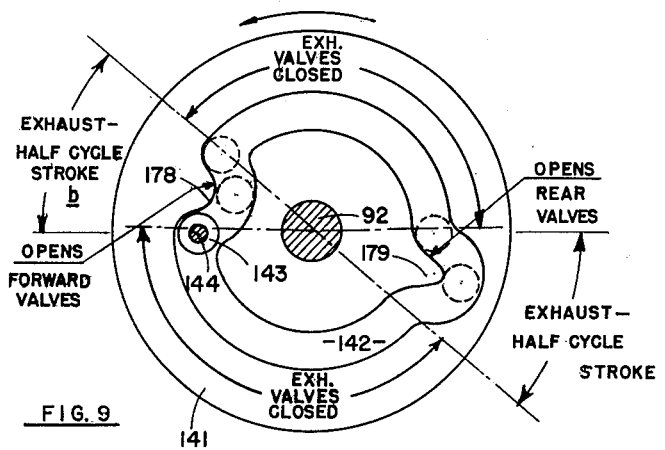
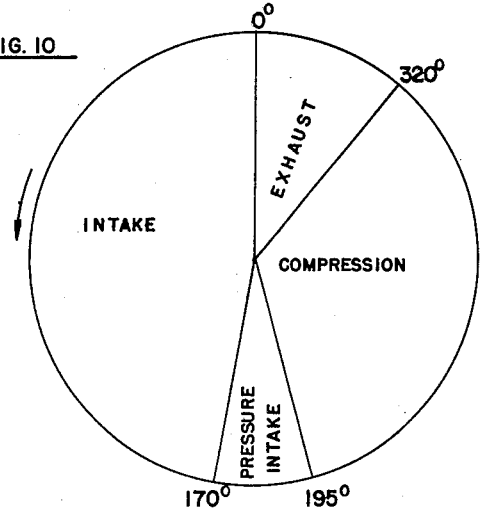
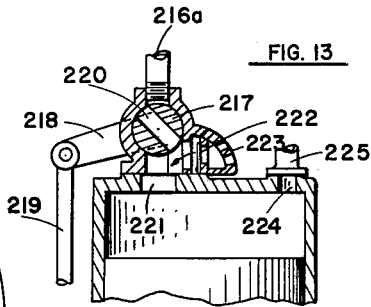
INVENTOR.
GEORGE E. HUGHES
BY
ATTORNEY

3,033,322
BRAKING AND RETARDING APPARATUS
George Edward Hughes, Huntington Park, Calif.
(2707 Illinois Ave., Southgate, Calif.)
Filed Sept. 30, 1957, Ser. No. 687,271
11 Claims. (Cl. 188—91)

This invention relates to apparatus and procedure for applying a brake force or retarding force to a rotating shaft.

In its operation it employs a gas, preferably air, which the apparatus compresses, by means activated by the rotating shaft. The compression of the air develops a substantial resistance to the rotation of the shaft, and the degree of this resistance, in accordance with the invention, can be nicely controlled by manual means.

The invention may be employed in any situation where a shaft is being rotated by a descending load, as in a situation where a shaft of a drawworks is being rotated by a drill string that is being "run-in" to a deep well. In other uses, the apparatus constructed in accordance with the invention enables it to function as an auxiliary brake for a truck or other vehicle carrying a heavy load over a roadway where the truck must negotiate steep and difficult grades.

Such grades today present a difficult problem to designers of conventional friction brakes, the brake-bands of which may fail while the vehicle having them is descending a steep grade. It is a fact that many accidents occur on busy roadways due to runaway trucks whose brakes have suddenly become inoperative and incapable of preventing a collision.

One of the objects of this invention is to provide a simple method and a simple brake apparatus or retarding mechanism capable of controlling the rotation of a driven shaft that is being rotated by primary force, regardless of whether the shaft is rotating in a fixed position, as in a drawworks or is a shaft carried on a vehicle and is being rotated by the momentum of a vehicle that may be descending a hill to prevent the attaining of a high, or dangerous, speed.

Another object of this invention is to provide simple apparatus for utilizing a pneumatic principle for developing a substantial and readily controlled resistance, for braking, or retarding, the descent of a vehicle advancing down hill, or for example, when a vehicle must be brought to a normal stop on a level roadway to substitute for the regular brakes.

While the invention involves the compression of atmospheric air, it lends itself admirably to use in a system that involves the step of maintaining a reservoir of air compressed to a higher pressure than atmospheric and admitting the same into a compressor cylinder to be compressed to a higher pressure at some point, for example, when a fraction of the cycle of movement has occurred. This step greatly increases the resistance to the torque that is driving the shaft to which the braking effort is applied. It is a fact also that when air is compressed, it becomes heated by the mere act of compressing it, and cools by its own expansion.

The development of this heat from compressing the air cannot be avoided, but it can be readily dissipated by radiation, with the desirable result of avoiding excessive use and heating of regular brake drums and their brake linings. In other words, while the compression of the air generates heat, such heat effects are removed from the regular brakes and dissipates itself harmlessly by radiation from piping and reservoirs where the heated air is held and where parts of the compressed air equipment can be permitted to have cooling off periods when the car is running on level roadways, or ascending grades.

While the admission of free air and its compression can afford a substantial resistance for reducing the speed of the vehicle, one of the objects of this invention is to provide the equipment employed in my invention with means for further compressing air that has been already compressed by the apparatus and already cooled by radiation. The admission of such cool precompressed air to the compressors I employ greatly increases the resistance torque to which a revolving shaft can be subjected.

And while my apparatus is intended primarily to operate to supplement regular car brakes, this invention can be applied as a brake or retarder for any rotating shaft, for example, this apparatus can be connected up to a shaft on drawworks such as employed in well drilling. In such case it would be applied to reduce the torque on a shaft being rotated by the descent of a string of pipe in a deep well.

Another situation occurs in which my invention has utility when a heavily loaded truck, for example, carrying a heavy load of pipe, is being drawn by an automobile is descending a steep grade, and the trailer element, or truck is without adequate brakes, or such brakes on a trailer-type truck are not connectable for control from the cab or, for example, a jeep-type auto that is drawing the trailer.

One of the objects of my invention is to provide means whereby the trailing truck can drive a compressor unit carried on the truck itself and driven off an axle common to the rear wheels of the truck, or from any other ground wheel of the truck.

In this case, on account of the space available, I prefer to employ a double acting type of compressor.

A further object of the invention as applied to such trailer elements is to provide means located in the cab of the tractor or jeep for enabling the apparatus to function utilizing precompressed air of relatively higher pressure to increase the torque resistance to which the trailer axle is developed, is also capable of cracking the valve as desired, to control the braking power torque, and also providing means for controlling the clutch that I provide on the trailer to close or open the same at will.

Further objects of the invention will be evident from a careful reading of the following specification and study of the accompanying drawing.

The invention consists in the novel method, and in the combination of elements of the invention now to be described all of which cooperate to produce an efficient method and an efficient braking and retarding apparatus.

A preferred embodiment of the invention is described in the following specification, while the broad scope of the invention is pointed out in the appended claims.

In the drawing:

FIGURE 1 is a plan illustrating a truck chassis to which this invention is indicated as applied. This view shows a dual type of compressor involving the use of two V-type compressors operated off a common shaft and disposed in tandem to each other with the shaft extending in a front-and-rear direction, and parallel with the axis of the driving shaft of the truck.

FIGURE 2 is a view on a much enlarged scale and illustrates one of the dual type compressors as viewed on the section line 2—2 of FIGURE 1, and looking toward the rear of the chassis. FIGURE 2a is a fragmentary view further illustrating details of the cam arrangement.

FIGURE 3 is a vertical section taken on the line 3—3 of FIGURE 2, passing through one of the cylinder heads of one of the compressors at the location of feather type inlet valves which may be used for admitting atmospheric air into the cylinders of this type of compressor. This view shows the valves in their closed position.

FIGURE 4 is a view similar to FIGURE 3, and is a section taken on the line 4—4 through the cylinder head of the right-hand cylinder shown in FIGURE 2; and this view shows the feather type valves in their open position.

FIGURE 5 is a plan of draw-works such as employed on a platform of an oil rig, and illustrating a single V-type compressor such as shown in FIGURE 2, applied to a shaft that would be rotated by the main cable drum of the draw-works.

FIGURE 6 is a side elevation of a tractor with trailer, and illustrating my invention as applied to the same. The compressor cylinders in this view are shown in tandem, with a common piston rod.

This view also illustrates the piping arrangement for delivering high pressure air from a reservoir to the cylinders, and the piping through which compressed air is returned to the reservoir through an intermediately located after-cooler, through which the compressed air heated by compression, cools by radiation before passing into the reservoir.

FIGURE 7 is a horizontal section through cylinders such as shown in FIGURE 6, but upon a greatly enlarged scale, and showing the valves for admitting compressed air of higher pressure than atmospheric, below instead of above the cylinders, and also showing the exhaust valves above for exhausting the compressed air from both ends of each cylinder. This view also illustrates the drive to the common piston rod from the dummy drive shaft at the rear of the trailer.

This view shows sections through the cams that drive the valve-stems for the high pressure air admission valves, and for the exhaust valves at the ends of the cylinders.

FIGURE 8 is a vertical section taken on the line 8—8 of FIGURE 7, illustrating the cam that drives the valve-stem for the high pressure air inlet valves of the two cylinders shown in FIGURE 7. This view is somewhat diagrammatic, and indicates the number of degrees in the cycle during which the intake valves of the high pressure air are open.

FIGURE 9 is a view similar to FIGURE 8, and is a vertical section on the line 9—9 of FIGURE 7, and illustrating the number of degrees of the revolution through the cycle, during which the exhaust valves for the cylinders are open.

FIGURE 10 is a cycle diagram illustrating the succession of intakes of atmospheric air, pressure intake air, and the approximate number of degrees during which compression takes place; and the number of degrees required during which the exhaust valves are open to take the higher compressed air from the ends of the cylinders when passing the same on to an after-cooler, such as shown in FIGURE 2.

FIGURE 11 is a fragmentary view showing the high pressure inlet valves in their closed position with their common stem broken away.

FIGURE 12 is a diagrammatic view showing a spring-loaded type of exhaust valve instead of a mechanically actuated valve; also showing an embodiment of the invention in which the piston functions as a valve for the high pressure air admission port.

FIGURE 13 is a sectional view through a cylinder head illustrating an embodiment of the invention in which the high pressure air from its reservoir can be admitted through an admission port in the cylinder head, and also free atmospheric air is admitted through the same port.

Referring more particularly to the parts, and especially to FIGURES 1 to 5 inclusive, it should be noted that the dual V-type compressor comprises two forward cylinders $A^1$ and $A^2$, while the rear section of this compressor comprises two corresponding cylinders $B^1$ and $B^2$.

As this portion of FIGURE 1 is more or less diagrammatic, no supports are represented for the mounting and supporting of the compressor.

Suffice it to say, that in practice two cross-bars similar to the cross-bar 2, may be employed to connect the side bars 1 of the chassis frame, and another such cross-bar would support the forward end of the compressor. For the sake of clarity, the forward one of these cross-bars is omitted, as it interferes with the showing of the clutch 3 and its operating lever 4. This clutch is mounted on a driven shaft 5, extending rearwardly from the reduction gear device 6, driven off the power take-off shaft 7, which projects rearwardly from the motor 8. This motor drives two pairs of rear wheels W of the truck through a differential (not illustrated) carried with a differential casing 9, on a drive-shaft 10 having a universal joint 11 at its forward end connected to the power-take-off 7; and a rear universal joint 12 that drives the usual conical pinion (not illustrated) that is located within its differential casing 9.

Pistons 28 within the cylinders $A^1$, $A^2$, $B^1$ and $B^2$ compress atmospheric air on the out-stroke, away from the axis of the common shaft, that will be described more in detail hereinafter; and the compressed air is delivered into two manifold pipes 13 and 14 that unite at a union 15 and from there the air passes through a delivery pipe 16 to an after-cooler 17 formed of tubing 17a that is preferably provided with fins 18.

The after-cooler radiates heat that was developed in the compressed fluid which in the present instance is air. This air, of course, will have become highly heated merely by the act of compressing it. The radiation to the atmosphere will reduce the temperature of the air to approach that of the atmosphere, and from the after-cooler the relatively cooled air passes by a pipe connection 19 to a reservoir 20 in which this high-pressure air is stored.

The pipe connection 19 includes a check-valve 21 that opens toward the reservoir 20, but not in a reverse direction.

The reservoir 20 is provided with a safety valve 22 that is set to the desired working pressure for the reservoir 20, for example, 100 p.s.i.

As shown in FIGURE 2, compressed air is supplied through the adjacent sides of the walls of all four cylinders by a short trunk line pipe 23 that is a feeder for two connecting branch pipes 24 that have laterally extending lead-in tips 25 connecting into circumferential passages 26 that serve circumferentially spaced ports 27 that extend radially in through the cylinder walls.

Referring still to FIGURE 2, which is a diagrammatic illustration as to the piping arrangement, but shows cylinders $A^1$ and $A^2$ in detail, these two V-type cylinders have their axis inclined at a forty-five degree angle to horizontal, and hence are located with their longitudinal axes perpendicular to each other. They carry reciprocating pistons the inner ends of which carry wrist-pins 29 attaching to their connecting rods 30, and the lower ends of the connecting rods attach to a common crank pin 31 on a common crank 32 extending transversely to the shaft 33; that is to say, the connecting rods of each pair of cylinders attach to a common crank.

Opposite the crank 32, but in line with the axial transverse plane of the cylinders $B^1$ and $B^2$ another crank 32' lies, similar to the crank 32, and to which connecting rods identical with the connecting rods 30, are connected. These connecting rods are not shown in the drawing as their illustration would merely detract from the clearness of the disclosure of the features that are related to each pair of cylinders which are operated from the same crank.

As shown in FIGURE 2, the cylinders $A^1$ and $A^2$ have identical cylinder heads 34, each having a flange 35 secured by bolts (not illustrated) to a circumferential flange 35a on the wall of the cylinder.

Each flange 35 is integral with the lower end of its cylindrical apron 36 that is itself integral with the disc portion of the head 34. The apron is spaced from the cylinder wall to form an annular socket 37, and in this socket a ring form valve 38 is mounted. This valve carries a shank 39 that extends down from it, terminating in an outwardly and upwardly extending inclined handle 40 for reciprocating the valve 38.

As illustrated in FIGURE 2, the inner face of the apron 36 has an annular groove 41 that extends circumferentially around the inner face of the apron 36.

In order to actuate the valve 38 each handle 40 has a valve stem 42 attached to it by a thread connection and this valve stem extends down in an inclined direction toward the medial vertical plane of the compressor and passes through a guide opening 43 in a bonnet 44 that forms part of the housing of the compressor.

These valves 38 operate as exhaust valves for the air compressed in the cylinders by the upward movement of the pistons 28.

In addition to the exhaust valves 38 each cylinder of the unit is provided with an inlet valve 45 which is similarly constructed to the valve 38, and is mounted to reciprocate in an annular valve-chamber 46, similar to the annular valve space 37 already described.

This valve space 46 is between the cylinder wall and the apron 47, which is integral with the cylinder wall at a point above the location of the valve 45. In addition to this, the inner face of the apron 47 has a circumferential groove 48, similar to the groove 41 which carries the incoming higher pressure air to two radial ports 49 that are formed through the cylinder wall. They are similar to the exhaust ports 27, already described.

The inlet valve 45 has means for operating it similar to that described above in connection with the exhaust valve 38. That is to say, the valve 45 has an operating handle 50 which is attached to a valve stem 51, the upper end of which is threaded into the handle. The lower end of this stem passes through a guide opening 52 in a guide bracket 53 secured to the outer face of the lower end of the cylinder wall.

The two valve stems 42 are actuated by a cam-shaft 54 the axis of which is in the vertical medial plane of the compressor unit; and a similar cam shaft 55 is provided just below the cam-shaft 54 for actuating the two high pressure air inlet valves.

All of the actuating stems for the valves are held against their cam faces by return springs 56, in the form of coils mounted on the stems and thrusting against discs 57 which are fixed collars on the stems.

Both the cam shafts are driven by a sprocket and chain 58 that is driven by a sprocket wheel 59 on the compressor shaft 33. In order to accomplish this the upper end of the chain 58 runs over a sprocket wheel 60 carried by the end of the upper cam-shaft 54, and the runs 61 of this chain engage opposite edges of a sprocket wheel 62 that is carried by the end of the lower cam-shaft 55.

The cam shaft 54 has two cams, namely a cam 63 that operates the stem 42, and a cam 64 that operates the stem 42 for the cylinder A'. These cams are laterally offset from each other, as indicated in FIGURE 2a, the small figure at the right of FIGURE 2. It shows the cams located laterally out of line with each other as they must be. The cam 63 is shown extending upwardly in active operation, and the cam 64 extending downwardly, but inactive at the instant. These cams may be formed integral with the same sleeve 65 which carries them and which is mounted on the cam-shaft 54.

When each piston is moving away from its corresponding head 34, a partial vacuum is developed between its upper face and the inner face of the cylinder head. This opens an inlet valve 68 to enable atmospheric air to flow in and follow the piston down in its travel.

The cam shaft 55 carries two cams 66 and 67 which cooperate respectively with the stems 51, and these two cams are mounted on the same sleeve on the shaft 55, and are also offset out of line with each other, in the same way as illustrated in FIGURE 2a, as described in connection with the cams 63 and 64.

While any desired type of inlet valve may be employed, in the present drawing I have illustrated a feather type inlet valve 68, the details of which are shown in FIGURES 3 and 4. In FIGURE 2, the "feather" plates of these valves are shown lying closed against their seats 69 at the left cylinder A² and in FIGURE 3 also.

In FIGURE 4 they are shown in their open position, which they assume when the piston is receding from the head that carries them, at which time atmospheric air flows down the ports 70 and past the "feather" elements into the upper ends of the cylinder.

In the intake stroke of each piston the atmospheric air admitted becomes a charge of air to be compressed on the next upstroke of the piston. During the upstroke and while the piston is below the inlet ports 49 for the high pressure air that is supplied from a reservoir, shown in FIGURE 2, a certain amount of compression of the charge of free air occurs, and presently to be referred to. During a fraction of the up stroke of the piston and before its upper face passes the ports 49, admission of higher pressure air occurs from a reservoir 71, maintained at high pressure by a relief valve 71a. As illustrated in FIGURE 2, this air is admitted through a main line 72 from the reservoir to a Y-connection 73 which has branches 74, the ends of which carry tips 25 that have a connection 75 through the outer face of the annular apron 47 where it is delivered into the annular groove 48. As this incoming air is at a relatively high pressure, for example, 100 lbs. per square inch, and the pressure of the air in the cylinder, being much lower, there will be sufficient excess of pressure in the high pressure air being admitted, to insure the admission of a full cylinder of air before the admission valve closes.

The air that is then being compressed in the cylinder includes the atmospheric air, originally admitted and the additional high pressure air, becomes compressed, and of course, heated by the act of compression.

Near the end of the compressing stroke the exhaust valve 38 opens and permits the air in the cylinder to exhaust through exhaust pipes 76 and pass up to an aftercooler like 17, composed of a plurality of small tubes of relatively small diameter through which the heated air must flow, while radiating their heat and carrying it off to the atmosphere. Of course, the pressure builds up in the after-cooler from the continued operation of the compressor cylinders, regardless of the loss of pressure due to the radiation and loss of heat in the air within the aftercooler, so that when the compressor is operating a checkvalve 79 at the far end of the after-cooler with respect to the direction of flow will deliver the air into the reservoir 71.

In FIGURES 6 and 7, I illustrate an adaptation of my invention to a double acting air compressor cylinder, that is to say, a cylinder in which the resistance of compressing the air is developed on both strokes of the piston. In fact, in these figures I disclose a compressor unit composed of two double acting cylinders arranged in tandem with each other. With this arrangement it is possible to develop a very high resistance to a rotating shaft to retard, or brake it, against rotation.

Referring still to FIGURES 6 and 7, they represent a tractor or automobile 80 having a fifth wheel connection 81 enabling it to tow a trailer 82, the rear wheels 83 of which include a driving connection 84 for rotating an inclined drive shaft 85 having a universal joint 86 through which a countershaft 87 under the platform 88 of the trailer is driven through a clutch 89. The drive means includes a pinion 90 meshing with a larger bevel gear 91 on a cross shaft 92.

The ends of shaft 92 are mounted in bearings such as the bearing 93, forward of leaf springs 94 at each side at the rear of the chassis 95 of the truck. The shaft 92 is provided with a crank 96 driving a connecting rod 97, attached to a reciprocating block 98, through a wrist pin 99.

The block 98 is carried on the rear end of a piston rod 100, which extends through a rear compressor cylinder 101 and through a forward compressor cylinder 102, disposed in tandem. The piston rod carries a piston 103 in the rear cylinder and a piston 104 in the forward cylinder. In reciprocating the piston rod a cross-head block 98 travels on a guide 105 secured to the underside of the chassis.

The forward head 106 of the forward cylinder is provided with an air inlet 107 for admitting atmospherc air on the rear stroke of the piston 104, and similar air inlet valves 108 are provided for the rear head 109 of the forward cylinder to admit atmospheric air on the forward stroke of piston 104. Similar air inlet valves 107 and 108 for atmospheric air are provided in the forward head 109a and the rear head 110 of the rear cylinder.

When the pistons 103 and 104 are travelling toward the left in the first stroke of the pistons, as indicated by the arrow in FIGURE 7, high pressure air is admitted to the cylinders through a group of equidistant ports 111 by two valves 116, preferably piston valves, secured to a common valve-stem 113. This stem passes completely through the valve-chest 114 of the rear cylinder, and its forward end lies in a forward valve-chest 115.

In the forward valve-chest it carries a similar piston valve 116.

Before the forward end of each piston laps its ports 111 the valve-stem 113 will have been moved forward by a cam 117 to advance both the valves 116 to their open position (see FIGURE 7), thereby admitting high pressure air from a high pressure reservoir R. into the cylinders. This air comes through a main pipe 118 having two branch pipes 119 as shown in FIGURE 6, and finally flows through two short nipple connections 120 as shown in FIGURE 7.

The time of closing the ports 111 by the valves 116 of course, depends upon the design of the cam 117, and it may be designed so as to close the ports 111 at any time before the forward face of the moving pistons have completely crossed the ports 111.

The supply of this high pressure air to the valve chests 114 and 115 is controlled by a 3-way hand valve 121 in the cab 122 of the tractor.

The valve 121 is supplied with high pressure air from the reservoir R, and this valve 121 enables high pressure air to flow down the pipe 123 to connect to a main pipe 118 through a coupling 124. The high pressure air is supplied from the reservoir R, through a pipe 125, and a similar coupling 126, and beyond the coupling a pipe 127 delivers the high-pressure air to the three-way valve 121.

The reservoir R is secured by means of a long integral flange 128 to the underside of the platform 88 of the trailer.

The valve-chests 114 and 115 are preferably cast integrally with a band 129 and 129a, and these bands can be slipped over the cylinders 101 and 102 before attaching valve-chests similar to the valve-chests 114 and 115 to control the exhaust valves through which the high-pressure air is led off from the ends of the cylinders to the reservoirs R. The bands 129 and 129a can be secured into position by welds 130, as indicated by FIGURE 7.

After the valve-chests 114 and 115 are welded into place, they effectively close the circumferential grooves 131 that operate as passages to deliver the high pressure air at the ports 111, which are diametrically opposite the location of the valve chests 114 or 115.

Also, after the bands 129 and 129a have been secured in place, similar bands 132 and 133 are slipped over the rear ends and the forward ends, respectively, of the two cylinders, after which they are secured in place by welds 134, similar to the welds 130.

At the ends of the two cylinders 101 and 102, exhaust ports 135 are provided, which open communication between the ends of the cylinders adjacent their heads, to the valve-chests 136 and 137, the former of which are located toward the rear of the cylinders and the latter of which are located toward the front or forward end of the cylinders.

These valve-chests are similar to the valve-chests 114 and 115. Within them piston-valves 138 and 139 are mounted, all of which are carried on a common long valve-stem 140, similar to the valve stem 113 and also actuated by a cam 141 on the shaft 92. These two cams are of the same type, and will be described more in detail presently. They have machined grooves 142 and 142a on their operating faces to retain conical rollers 143, respectively in each groove; and these rollers have coaxial pins 144 received in heads 145 at the ends of the two stems.

Each of these cams is preferably formed with a body having a hub-like formation near its axis carrying one machined side face of a machined groove and said body has a disc-form extension to the working side of which a rim 146 is attached by means of small fasteners or screws, 147, and this rim is machined on its inner edge to match up with the machined face on the hub-like body of the cam. These cams, of course, are secured to the shaft 92 by set screws 148 or other fastening means.

The stem 140 passes through all of the valve chests from the rear and carries the valves 138 and 139 located as shown on the stem in FIGURE 7.

In the operation of these compressor cylinders it should be understood that the pistons 103 and 104 are shown in their extreme outward position of their travel and at an instant when they are about to perform the first half-cycle of their complete movements by moving in the direction indicated by the arrow a in FIGURE 7.

At this moment the rear valves 138 have already become closed, and this is true also of the valves 139. As the pistons advance in this stroke high pressure air will be admitted by the valves 116, but after they close and the pistons have passed their admission ports 111, real compression of the charge of air within each cylinder begins, and as the pistons approach the forward heads 106 and 109a the valves 139 will move toward the right to an open position, thereby permitting the charge of compressed air to exhaust from the cylinders through their exhaust ports 135, and this air passes through the valve-chests across the forward end of the valves 139, and thence through the outlet nipples 149 that lead the air into a return main 150 which leads directly to the reservoir R, but preferably to an intermediate element functioning as an after-cooler, such as the after-cooler 17 described in connection with FIGURE 2; and from the after-cooler the air passes into the reservoir R. The reservoir is provided with a relief-valve 151, one of the functions of which is to maintain compressed air in the reservoir at a desired uniform high-pressure, for example, 150 lbs. per square inch, to which the relief-valve 151 would be adjusted, or set.

After the compressed air is discharged from the forward ends of the cylinders, the pistons 103 and 104 begin their return stroke in the half-cycle corresponding to the arrow b shown in FIGURE 7, then the "feather" strips (thin plates) 152 of the air inlet valves 107 will assume the curved position shown in FIGURE 4, thereby admitting atmospheric air to give the cylinders an initial charge of atmospheric air behind the pistons as they advance toward the right.

In this return stroke (b) admission of high pressure air is effected through the ports 111, which air becomes compressed as described hereabove in connection with the forward stroke indicated by the arrows (a), and of course, after the valves 116 shut-off the admission of high pressure air from the reservoir the carriage is compressed just as in sroke (a) and is exhausted through exhaust ports 135 at the rear ends of the cylinders, at which time the valves 138 will have been moved toward the left so as to open the exhaust ports and permit the compressed air to flow through the rear nipples 149 into the pipe main 150 leading to the reservoir.

In connection with the cylindrical chambers 153 of the valve-chests, it should be stated that in order to prevent the accumulation of high pressure air in the rear ends of the chambers of the rear and forward valve-chests 136 and 137, which might develop considerable resistance in moving the valves 139 toward their open positions, I provide small bleeder openings 154 through which any air accumulation can vent itself to the atmosphere. Similar small vents 155 are provided at the forward ends of the chambers in the rear valve chests 136. And similar vents 156 are provided at the forward ends of the valve chambers 114 and 115 for the same purpose.

Referring again to the clutch 89 illustrated in FIGURE 6, means are provided for closing this clutch at will by the driver of the tractor in his cab 122. In order to accomplish this the movable clutch member 157 can be moved forward to its closing position by actuating a forked lever 158 by admitting compressed air through a pipe 159 to an air cylinder 160 attached under the platform 88 of the trailer.

The extended piston rod 161 has a pin-and-slot connection 162 to a lever under the platform 88 which is attached to a shaft 163 that carries the clutch-lever 158. In other words, when the piston rod 161 is actuated to move rearwardly the clutch lever 158 will move forward to close the clutch and start up the drive of the shaft 92 and the pistons of the compressor cylinders 101 and 102. The clutch is normally held open by the coil spring 158a.

In order to accomplish this a 3-way valve 164 is provided in the cab supplied with compressed air through a pipe 165 taking air from the regular brake system (not illustrated) of the tractor or vehicle. When the hand lever of this valve is moved to open position, compressed air will flow down from the valve to a pipe connection 166, and thence rearwardly to a coupling 167 where the pipe connection connects to a loop 168 of a hanging hose 169, the upper end of which connects to a long pipe 170 running rearwardly in the platform 88, and the rear end of which is connected at a coupling 171 to the inlet pipe 159 for the air cylinder 160. In one position this valve 164 exhausts from pipe 166 to atmosphere.

Referring again to the cams 117 and 141, and their stems, it should be said that in practice guides 172 and 173 should be provided for the stems located as near as possible to the forward edges of the cams. These guides should be supported in a fixed position at some part of the casing 174 that houses the cams.

In connection with the 3-way valve 121, shown in FIGURE 6, it should be stated that the valve's lever 175a can be moved into a position that will connect pipe line 123 to an outlet 121a from this valve to atmosphere. This will release all the air in the pipe main 118, but not from the reservoir R.

It is also evident that in the apparatus illustrated in FIGURES 6 and 7 an after-cooler can be inserted in the pipe 150 at its riser 150a which would deliver through a check-valve like check-valve 79 into the reservoir R.

Referring again to FIGURES 8 and 9, it should be noted that these two figures are vertical sections taken on the lines 8—8 and 9—9 respectively, of FIGURE 7, and hence in reading these figures, it should be realized that the right side of each cam is at a greater distance from the cylinders than the left side or edge of each cam.

FIGURE 10 will be of assistance in considering the showing in FIGURES 8 and 9, but with FIGURE 10 it should be noted that this view indicates an anticlockwise rotation which is the same as is indicated by the arrow on the shaft 92 of FIGURE 7.

Let us assume that in the position in which the two pistons 103 and 104 start to advance toward the left the cylinder's chambers in front of them are already full of free air that was taken into the cylinders on their previous stroke toward the right.

Furthermore, as the pistons start their advance toward the left the roller 143 will ride up on the arcuate face 175 of the tongue 176, of cam 117 which will shift the valve stem 113 and move the valves 116 to the open position in which they are showing in FIGURE 7. This will admit high pressure air into the cylinders before the pistons arrive at the ports 111; and as soon as the forward faces of the cylinder pistons pass the ports 111, or the valves 116 close, the high pressure air admitted to the cylinders becomes under compression.

When the pistons are moving from left to right the same sequence of actions occur, activated by the tapered tongue 177 of the cam 117.

The compression continues until the pistons moving toward the left arrive quite near their exhaust ports 135, at the left end of the cylinders. At this moment the cam 141 will shift the valve stem 140, toward the right, and open the valves 139, so that the compressed air will flow out through the nipples 149 into the pipe main 150 which leads the compressed air into the reservoir R.

This opening movement of the valves 139 is effected by the tapered tongue 178 of the cam 141 which moves the roller 143 for this cam toward the right to open the exhaust valves 139 at the left ends of the two cylinders, which moves the pistons toward their position shown in FIGURE 7.

When the next stroke is terminating with the pistons 103, and 104, approaching the end of their travel toward the right the tapered tongue 179 will move the valve stem 140 and the valves 138 toward the left, and open them at the proper instant to establish the exhaust through the exhaust ports 135 at the right ends of the cylinders.

In the open positions of the valves 139 the valves 138 will completely lap their ports 135, and vice versa, when the valves 138 are open the valves 139 completely lap their ports 135. This enables the valves to function independently of each other although they are carried on the same valve stem 140.

FIG. 10 illustrates diagrammatically the cycle of the device of this invention. During the first 170° of travel of the crank of the compressor, as indicated by the sector marked "intake" between the 0 and 170° mark in FIG. 10, atmospheric air is admitted into the compressor cylinder. During the next 25° of travel, from 170° to 195°, the high pressure intake valve opens and admits the highly pressurized air from the reservoir. For the next 125° of rotation the gases within the cylinder are compressed, while in the last 40° of movement the exhaust from the compressor cylinder into the reservoir takes place.

Referring again to FIGURE 6, if desired a check valve cv may be carried in the pipe connection 150. This check valve opens toward the reservoir R which prevents the reservoir emptying itself of compressed air if, and when, the lever 175a of the 3-way valve 121 is placed in a position to exhaust the air from pipeline 118.

When a check valve cv is installed in pipe 150 a bypass pipe may be installed in pipe 150 if desired, ahead of the check valve cv to lead the air, normally going to the reservoir R, to the 3-way valve 121. Lever 175a can be moved into a position that will connect pipeline 123 to an outlet 121a from this valve to atmosphere. This will release all of the air as soon as it is compressed by the compressor, allowing the compressor to operate partially "unloaded" when first starting the compressor, to assure better lubrication before placing a heavy load on it. In this usage a 4-way valve should replace the 3-way valve 121.

In connection with the application of the retarding or braking effect through the instrumentality of the 3-way valve it should be stated that the clutch 89 is a friction clutch and is engaged by 3-way valve 164 when the hand lever of this valve 164 is moved to the open position, which starts the compressor operating. When the hand lever of valve 164 is moved to closed position the air pressure is exhausted which permits spring 158 to open the clutch.

In descending a grade, and after the clutch is engaged, that is closed, the driver in the cab has control of the speed of the truck or the vehicle provided with this equipment, by reason of his manual control of the 3-way valve 121. By changing the position of the control lever 175a, to increase the volume of the high pressure air passing to the cylinders, the resistance to its compression by the pistons 103 and 104 become increased.

In FIGURE 5 I illustrate in plan, the application of my invention to a hoisting apparatus, commonly called a drawworks, indicated by the reference numeral 180, on the floor 181 of a drilling rig. In this installation a diesel engine 182 at the side of the floor drives the gearing of the draw-works through an endless chain 183 running over a sprocket wheel 184 carried on the shaft 185; and this chain drives a power input shaft 186, which through additional gearing including sprocket chain 187a drives a power output shaft 188 which drives the endless chain 187b, which in turn drives the main draw-works drumshaft 191 during hoisting operations only.

When lowering a drill string into the well, of course, no power is used and the main-drum shaft 191 is allowed to run free. Its movement then is controlled by the usual friction hand brakes normally supplied on the draw-works.

Referring now to FIGURE 5, when it is necessary to handle heavy loads of drill-string or even casing for deep wells, the main drum 195 of the drumworks carries the cable 194 that runs up to the overhead sheave at the peak of the derrick, with a fall supporting the load. The drum shaft 191 and the shaft 189 of the compressor unit 190 are connected by a jaw clutch 196 operable by a clutch lever 197.

This compressor has an air inlet 201 for free air, and a supply pipe 193 that leads high pressure compressed air to it from a high pressure reservoir (not illustrated), a 3-way valve 198 on this pipe connection controls the supply of compressed air that flows through branch pipes 199 and 200 to lead this air through the side walls of the cylinders near the middle points as illustrated in FIGURE 7. The branch pipes 199 and 200 deliver the high pressure air through the walls of the cylinders at about their middle so as to be further compressed after its admission, by the advance of the pistons (not shown).

The cylinders have free air inlets 201 on their heads and exhaust outlet connections 202 that lead to a pipe main 203 that leads to a high pressure reservoir such as reservoir R shown in FIGURE 6.

By means of the lever 204 of the 3-way valve 198 the supply of compressed air passing into the cylinders to be further compressed, can be regulated to increase or decrease resistance to the rotation of the drum shaft, 191 when lowering a drill string, but when pulling drill string or pipe casing from the well, of course, the clutch 196 is thrown open.

When the drill string has been prepared for its descent into the well and the drum 195 is held stationary by the hand brakes of the drawworks, the jaw clutch 196 is engaged, by closing a clutch lever 197. When the drawworks operator releases his regular hand brake the drill string starts its descent into the well and the torque developed by the weight of the drill string is restrained and reduced by the compressor unit 190. The amount of resistance is then controlled by the amount of air allowed to pass through the 3-way valve 198.

While I have illustrated a small two cylinder compressor in FIGURE 5, it is obvious that instead of the compressor illustrated, any type and size compressor unit could be substituted such as is shown in FIGURE 6, or FIGURE 1. In other words, the compressor system would be adapted to the duty required of the apparatus with enough power of resistance to enable a drill string for the well to be lowered after each stand of drill tubing is attached, handily and without risk of its running away in its descent.

Referring again to the relief valve 151, it should be clear that its function is three-fold. Primarily it is the exhaust valve for the pneumatic brake system and functioning in cooperation with the exhaust valve of the compression cylinder. The exhaust valve of the cylinder serves only to delay the exhaust during the compression stroke to increase the torque developed by compressing both the free air and the high pressure air.

When the cylinder exhaust valve opens the high pressure air received from the reservoir during the compression stroke, is replaced in the reservoir by air from the compressor to bring the working pressure back to normal. The free air admitted simultaneously puts the reservoir pressure above working pressure causing the relief valve to open to release an amount of air equivalent to all of the free air not needed to maintain the working pressure, and which is taken into the cylinder during the intake stroke.

When the compressor is operating there is an almost continuous stream of warm air exhausting through this valve similar to the exhaust of an internal combustion engine. Therefore I consider this valve the true exhaust valve. The exhaust valve on the cylinder acts only as a delaying check-valve. The relief valve assists in cooling the apparatus by expelling warm air and also acts as a safety valve.

Referring now to the fundamental characteristics of my method, it should be stated that in accordance with my method of procedure in practicing the invention, it is a fact that when compressing air as occurs in my system, it becomes heated in accordance with the laws of thermodynamics. This rise in temperature increases the pressure of air in the cylinders as the act of compression progresses during each compressing stroke. This, of course, increases the resistance developed by the compressor to the rotation of the shaft that is driving the compressor.

It is a fact also, that when air under pressure performs work in expanding and losing its pressure, the expanding air becomes cooler automatically. On this account, if and when the air compressed in the compressor flows into the after-cooler or the reservoir where the pressure is lower, than that of the incoming air an adiabatic cooling effect occurs within the after-cooler or reservoir. This contributes to the elimination of the heat developed by the pistons on their compression strokes, before the subsequent cooling by radiation.

For this reason it is unnecessary to provide means such as water cooled radiators in the apparatus, to assure that undue heating of the apparatus could not occur.

The cooling of the air in the after-cooler by radiation is not essential in my method, but it is desirable to prevent too high heating effects developing in the compressors in prolonged applications.

In FIGURE 12 I illustrate an embodiment of this invention in which a compressor 205 of any type is provided with a spring loaded exhaust valve 206 in its head delivering compressed air from the compressor into a receiver 207 that connects to a cooling coil 208 indicated diagrammatically but having sufficient volume to enable it to function as a reservoir. The outer end of this coil connects to a pipe line 209 that leads to a 3-way valve (not illustrated) but located at a control station, and which is connected to a return pipe line 210 that leads the high pressure air to an intermediate point 211 on the length of the cylinder 212 where it delivers into an annular passage 213 encircling the cylinder wall and provided with a group of ports 214 spaced around the cylinder wall. The 3-way valve referred to is not essential in all applications of the invention.

A relief valve determines the working pressure that will be maintained in the coil type reservoir.

A free air inlet valve 216 is employed as shown in FIGURE 12.

In FIGURE 13 a pipe connection 216a from a high pressure reservoir delivers high pressure air to a rocking valve-closure 217 with an actuating arm 218 rocked by a valve-rod 219 that is driven by an eccentric (not illustrated). The movement is timed to connect its passage 220 to an inlet port 221 that is also used by a feather type admission valve 222 with a perforated hood 223 indicated by the arrow.

The high pressure air, of course, is admitted to the cylinder while the piston in the cylinder is approaching the cylinder end, or has reached the end, of the intake stroke.

The exhaust port 224 is also in the head and has a pipe connection 225 which is provided with a rocker type exhaust valve (not illustrated), but similar in construction to the rocker valve 217, and timed to open as the piston is completing its up-stroke.

Many other embodiments of this invention may be resorted to without departing from the spirit of the invention.

I claim as my invention and desire to secure by Letters Patent:

1. In a pneumatic brake apparatus for subjecting a rotating shaft to a braking force, the combination of a driven shaft, an air compressor driven by said shaft, and having at least one compression cylinder with a reciprocating piston therein, an air reservoir, means for maintaining a relatively high pressure in the reservoir, said piston having an intake stroke and a compressing stroke, inlet valve-means for admitting atmospheric air to the cylinder during the intake stroke for compressing the same, valve port means connected by a passage means to the reservoir for admitting high pressure air from the reservoir into the cylinder for compressing the same and thereby developing a high resistance and braking force to the rotation of the driven shaft, and outlet valve-means connected by another passage means to the reservoir for admitting the air compressed in the compression stroke, to said reservoir.

2. A pneumatic brake apparatus for subjecting a driven shaft to a braking force, according to claim 1, including a rotating shaft, driving connection from the rotary shaft to the driven shaft, which includes means for driving the driven shaft at a different number of revolutions per minute than that of the rotating shaft that is to be braked.

3. A pneumatic brake apparatus for subjecting a driven shaft to a braking force, according to claim 1, including valve-means for admitting the high pressure air, a cam powered by the driven shaft, operating to open the said high pressure valve-means to admit the high pressure air to the cylinder when the piston has progressed through a fraction of its travel in its cycle movement.

4. A pneumatic brake apparatus for subjecting a driven shaft to a braking force, according to claim 1, which includes an air admission port-means located at a point on the side of the cylinder wall that will be lapped and closed by the piston on the compression stroke; and includes a cam powered by the driven shaft for controlling the high pressure admission valve-means to close the same at some time before the piston laps the said side port in the cylinder.

5. A pneumatic brake apparatus for subjecting a driven shaft to a braking force, according to claim 1, including valve means for admitting the high pressure air, a cam powered by the driven shaft operating to close the said high pressure valve-means for admitting the high pressure air to the cylinder when the piston has progressed through a fraction of its travel in its compression stroke.

6. In a pneumatic apparatus for subjecting a rotating shaft to a braking force, the combination of a driven shaft with reduction gearing and a clutch for driving the same from the said rotating shaft at a different speed of rotation with respect to the said rotating shaft, a plurality of compressor cylinders with reciprocating pistons traveling therein, inlet valve-means for admitting free air to the said cylinders during the intake stroke, a high pressure air reservoir, said cylinders having high pressure inlet ports through their side walls, means for conducting high pressure air from said reservoir to said high pressure inlet ports, said high pressure inlet ports being located on the side walls of said cylinders at a point such that the tips of said pistons pass and uncover the same during their travel on their intake stroke, thereby permitting the high pressure air from the reservoir to enter said cylinders and mix with the free air already admitted to the same, during the time consumed by said pistons during the first part of the compression stroke up to the instant that the pistons lap and close the said side ports, after which compression of the air in the cylinders occurs, thereby developing a braking force exerted upon the driven shaft; and cylinder heads on said cylinders with outlet valve-means located thereon, and means for conducting the compressed air from the outlet-valves into said reservoir.

7. In a pneumatic apparatus for subjecting a rotary shaft to a brake force, according to claim 6, in which the said reservoir is composed of piping with means for radiating the heat from its contained compressed air, and including a connection from a remote point of the piping composing the reservoir to the said side ports in the said cylinder walls.

8. In a pneumatic apparatus for subjecting a rotary shaft to a brake force, according to claim 6, in which the said reservoir is composed of piping with means for radiating its heat from its contained compressed air, and including a connection from the remote end of the pipe composing the reservoir to the said side ports in the said cylinder walls; and in which the outlet valve-means for each cylinder includes a gang of valves with a manifold hood covering the same; and in which the said manifold hood is connected to the adjacent end of the pipe-form reservoir.

9. A retarding device comprising a cylinder means, a rotatable shaft, a piston means in said cylinder means, said piston means being operatively connected to said shaft and reciprocative in said cylinder means through a suction stroke in one direction and a compression stroke in the opposite direction, said rotatable shaft being connectable to a shaft to be retarded and operable thereby, means operatively controlled by said rotatable shaft for providing a pressurized fluid in said cylinder means after said piston means has substantially completed said suction stroke for thereby increasing the force required to move said piston means through said compression stroke and offering a retarding force to a shaft connected to said rotatable shaft, exhaust means for exhausting the fluid compressed in said cylinder means, and passage means interconnecting said exhaust means and said means for providing pressurized fluid for thereby conducting fluid compressed in said cylinder means to said means for providing pressurized fluid, whereby said cylinder means supplies said pressurized fluid.

10. A retarding device comprising a cylinder means, a piston means in said cylinder means, said piston means being reciprocative in said cylinder means through a suction stroke in one direction and a compression stroke in the opposite direction, said piston means being connectable to a shaft to be retarded and operable through said strokes thereby, means for admitting relatively low pressure air into said cylinder means during said suction stroke, means controlled by said piston means for admitting pressurized air into said cylinder means after said piston means has substantially completed said suction stroke for thereby increasing the force required to move said piston means through said compression stroke and offering a retarding force to a shaft connected to said piston means, exhaust means for exhausting the air compressed in said cylinder means, and passage means interconnecting said exhaust means and said means for providing pressurized air for conducting air compressed in said cylinder to said means for providing pressurized air and supplying the pressurized air therefor.

11. A braking device comprising a shaft, at least one cylinder, a piston in said cylinder, rod means interconnecting said piston and said shaft whereby said shaft is rotatable by reciprocation of said piston, an air reservoir, means for maintaining a relatively high pressure in said reservoir, said piston being reciprocative through an intake stroke and a compression stroke, inlet means for admitting atmospheric air into said cylinder during said intake stroke, a valve means, a passage means connecting said valve means to said reservoir for conducting pressurized air from said reservoir to said cylinder, said valve means being connected to and operably controlled by said shaft for so admitting pressurized air into said cylinder after said piston has substantially completed said intake stroke, whereby pressurized air so introduced provides a high resistance to movement of said piston and said compression stroke, outlet valve means to said reservoir for admitting air compressed during said compression stroke into said reservoir, said outlet valve means including closing means for shutting off said outlet valve means after said compression stroke and preventing the return of said compressed air to said cylinder during said intake stroke.

References Cited in the file of this patent

UNITED STATES PATENTS

| | | |
|---|---|---|
| 1,067,441 | Prather | July 15, 1913 |
| 1,315,104 | Ewald | Sept. 2, 1919 |
| 1,477,004 | Rhodes | Dec. 11, 1923 |
| 1,487,347 | Martin | Mar. 18, 1924 |
| 1,891,083 | Dodge | Dec. 13, 1932 |
| 2,254,563 | Brinneman | Sept. 2, 1941 |
| 2,256,302 | Wehmeier | Sept. 16, 1941 |
| 2,703,219 | Henshaw | Mar. 1, 1955 |
| 2,760,439 | Crookston | Aug. 28, 1956 |
| 2,771,967 | Larson | Nov. 27, 1956 |

FOREIGN PATENTS

| | | |
|---|---|---|
| 3,490 | Great Britain | Feb. 18, 1895 |
| 114,905 | Great Britain | Apr. 25, 1918 |

UNITED STATES PATENT OFFICE
CERTIFICATE OF CORRECTION

Patent No. 3,033,322                                    May 8, 1962

George Edward Hughes

It is hereby certified that error appears in the above numbered patent requiring correction and that the said Letters Patent should read as corrected below.

Column 8, line 69, for "carriage" read -- charge --; line 70, for "sroke" read -- stroke --; column 11, line 30, for "drumworks" read -- drawworks --; column 15, line 18, for "and" read -- in --.

Signed and sealed this 30th day of October 1962.

(SEAL)
Attest:

ERNEST W. SWIDER
Attesting Officer

DAVID L. LADD
Commissioner of Patents